(12) United States Patent
Liu et al.

(10) Patent No.: US 8,624,862 B2
(45) Date of Patent: Jan. 7, 2014

(54) METHOD FOR MAKING TOUCH PANEL (75) Inventors: Chang-Hong Liu, Beijing (CN); Kai-Li Jiang, Beijing (CN); Liang Liu, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/549,584

(22) Filed: Jul. 16, 2012

(65) Prior Publication Data

US 2012/0279052 A1 Nov. 8, 2012

Related U.S. Application Data (62) Division of application No. 12/286,155, filed on Sep. 29, 2008, now Pat. No. 8,248,379.

(30) Foreign Application Priority Data

Dec. 14, 2007 (CN) .......................... 2007 1 0125116

(51) Int. Cl.
*G06F 3/041* (2006.01)

(52) U.S. Cl.
USPC .......................................................... 345/173

(58) Field of Classification Search
None
See application file for complete search history.

(56) References Cited

U.S. PATENT DOCUMENTS

| | | | | |
|---|---|---|---|---|
| 6,630,772 | B1 * | 10/2003 | Bower et al. | 313/311 |
| 2007/0153363 | A1 * | 7/2007 | Gruner | 359/315 |
| 2008/0238882 | A1 * | 10/2008 | Sivarajan et al. | 345/174 |
| 2009/0169819 | A1 * | 7/2009 | Drzaic et al. | 428/156 |

* cited by examiner

*Primary Examiner* — Adam R Giesy
(74) *Attorney, Agent, or Firm* — Altis Law Group, Inc.

(57) ABSTRACT

A method for making a touch panel is provided. The method includes providing at least one array of carbon nanotubes, a first substrate, and a second substrate. The at least one array of carbon nanotubes is pressed by using a pressing device to form a carbon nanotube structure. A first electrode plate is formed on the first substrate and a second electrode plate on the second substrate. Two first-electrodes are located on opposite sides of the first electrode plate and two second-electrodes on opposite sides of the second electrode plate. The first electrode plate is spaced a distance from the second electrode plate such that the first conductive layer and the second conductive layer face each other.

13 Claims, 7 Drawing Sheets

METHOD FOR MAKING TOUCH PANEL

RELATED APPLICATIONS

This application is a divisional of U.S. patent application Ser. No. 12/286,155, filed on Sep. 29, 2008 entitled, "TOUCH PANEL, METHOD FOR MAKING THE SAME, AND DISPLAY DEVICE ADOPTING THE SAME". The disclosures of the above-identified applications are incorporated herein by reference.

BACKGROUND

1. Field of the Invention

The present invention relates to a method for making such touch panel.

2. Discussion of Related Art

Following the advancement in recent years of various electronic apparatuses, such as mobile phones, car navigation systems, for example, toward high performance and diversification, there has been continuous growth in the number of electronic apparatuses equipped with optically transparent touch panels in front of their respective display devices (e.g., liquid crystal panels). A user of any such electronic apparatus operates it by pressing or touching the touch panel with a finger, a pen, stylus, or another tool while visually observing the display device through the touch panel. A demand thus exists for such touch panels that are superior in visibility and reliable in operation.

At present, different types of touch panels, including a resistance-type, a capacitance-type, an infrared-type, and a surface sound wave-type, have been developed. Due to the high accuracy and low cost of production of the resistance-type touch panel, this touch panel has become widely used.

A conventional resistance-type touch panel includes an upper substrate, an optically transparent upper conductive layer formed on a lower surface of the upper substrate. In addition, a lower substrate, an optically transparent lower conductive layer formed on an upper surface of the lower substrate, and a plurality of dot spacers formed between the optically transparent upper conductive layer and the optically transparent lower conductive layer. The optically transparent upper conductive layer and the optically transparent lower conductive layer are formed of conductive indium tin oxide (ITO).

In operation, an upper surface of the upper substrate is pressed with a finger, a pen, or another tool, and visual observation of a screen on the liquid crystal display device provided on a back side of the touch panel is provided. The pressing causes the upper substrate to be deformed, and the upper conductive layer thus comes in contact with the lower conductive layer at the position where the pressing occurs. Voltages are applied successively from an electronic circuit to the optically transparent upper conductive layer and the optically transparent lower conductive layer. Thus, the electronic circuit can detect the position of the deformation.

The optically transparent conductive layer (e.g., ITO layer) is generally formed by means of ion-beam sputtering, and this method is relatively complicated. Additionally, the ITO layer has poor durability, low chemical endurance, and uneven resistance over an entire area of the touch panel. Furthermore, the ITO layer has relatively low transparency. All the above-mentioned problems of the ITO layer makes for a touch panel with somewhat low sensitivity, accuracy, and brightness.

What is needed, therefore, is to provide a durable touch panel with high sensitivity, accuracy, and brightness, a method for making such touch panel, and a display device using the touch panel.

BRIEF DESCRIPTION OF THE DRAWINGS

Many aspects of the present touch panel, method for making the same, and display device adopting the same can be better understood with reference to the following drawings. The components in the drawings are not necessarily to scale, the emphasis instead being placed upon clearly illustrating the principles of the present touch panel, method for making the same, and display device adopting the same. In the drawings, all the views are schematic.

Corresponding reference characters indicate corresponding parts throughout the several views. The exemplifications set out herein illustrate at least one embodiment of the present touch panel, method for making the same, and display device adopting the same, in at least one form, and such exemplifications are not to be construed as limiting the scope of the invention in any manner

DETAILED DESCRIPTION

Reference will now be made to the drawings to describe, in detail, embodiments of the present touch panel, method for making the same, and display device adopting the same.

Figure 1:
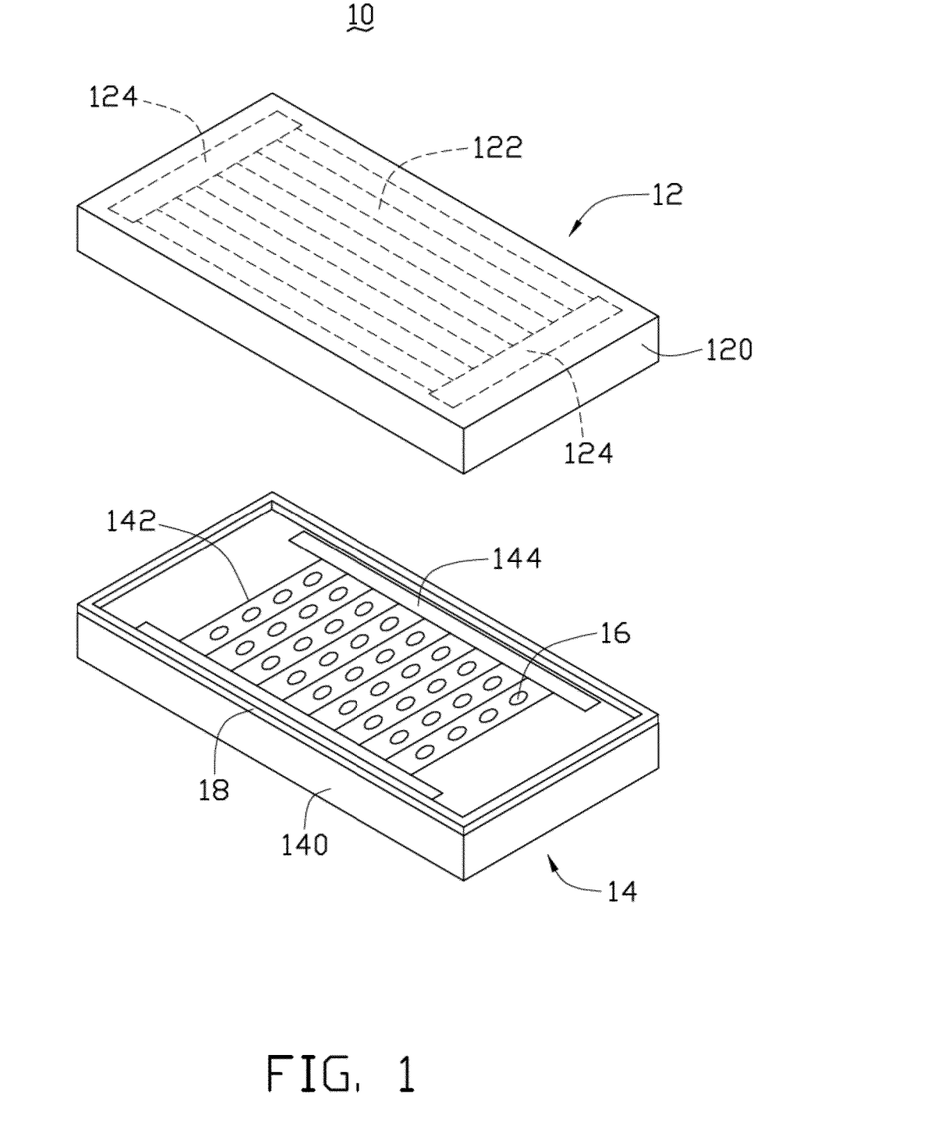
FIG. 1 is an exploded, isometric view of two electrode plates of a touch panel in accordance with an exemplary embodiment of the present invention, showing an upper one of the electrode plates inverted.
Figure 2:
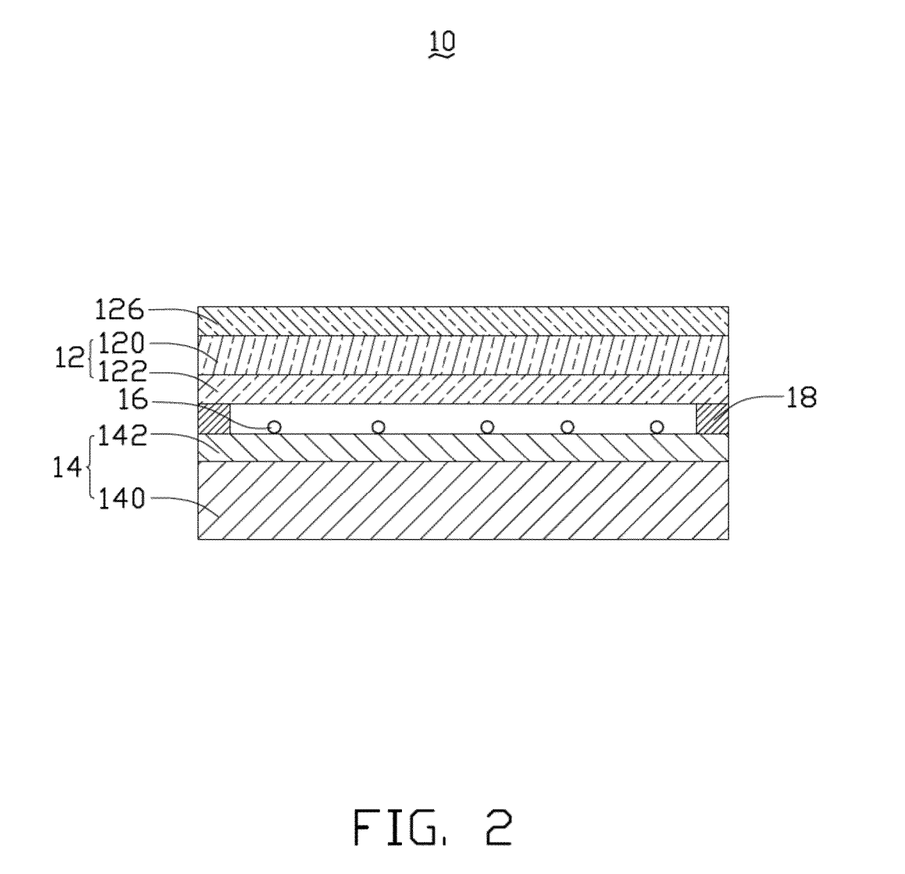
FIG. 2 is a side, cross-sectional view of the touch panel of the exemplary embodiment once assembled.

FIG. 1 and FIG. 2, illustrates a touch panel 10 of one embodiment. The touch panel 10 includes a first electrode plate 12, a second electrode plate 14, and a plurality of dot spacers 16 located between the first electrode plate 12 and the second electrode plate 14.

The first electrode plate 12 includes a first substrate 120, a first conductive layer 122, and two first-electrodes 124. The first substrate 120 includes an upper surface and a lower surface. The two first-electrodes 124 and the first conductive layer 122 are located on the lower surface of the first substrate 120. The two first-electrodes 124 are located separately on opposite ends of the first conductive layer 122. A direction from one of the first-electrodes 124 across the first conductive layer 122 to the other first-electrode 124 is defined as a first direction. The two first-electrodes 124 are electrically connected with the first conductive layer 122.

The second electrode plate 14 includes a second substrate 140, a second conductive layer 142, and two second-electrodes 144. The second substrate 140 includes an upper surface and a lower surface, each of which is substantially flat. The two second-electrodes 144 and the second conductive layer 142 are located on the upper surface of the second substrate 140. The two second-electrodes 144 are located separately on opposite sides of the second conductive layer 142. A direction from one of the second-electrodes 144 across the second conductive layer 142 to the other second-electrode 144 is defined as a second direction. The two second-electrodes 144 are electrically connected with the second conductive layer 142.

The first direction is perpendicular to the second direction. That is, the two first-electrodes 124 are aligned parallel to the second direction, and the two second-electrodes 144 are aligned parallel to the first direction. The first substrate 120 is a transparent and flexible film or plate. The second substrate 140 is a transparent plate. The first-electrodes 124 and the second-electrodes 144 are made of metal or any other suitable material. In the present embodiment, the first substrate 120 is a polyester film, the second substrate 140 is a glass plate, and the first-electrodes 124 and second-electrodes 144 are made of a conductive silver paste.

An insulative frame 18 is provided between the first and second electrode plates 12, 14. The first electrode plate 12 is located on the insulative frame 18. The first conductive layer 122 is opposite to, but is spaced from, the second conductive layer 142. The dot spacers 16 are separately located on the second conductive layer 142. A distance between the second electrode plate 14 and the first electrode plate 12 is in an approximate range from 2 to 20 microns. The insulative frame 18 and the dot spacers 16 are made of insulative resin or any other suitable insulative material. The insulative frame 18 and the dot spacers 16 provides insulation between the first electrode plate 12 and the second electrode plate 14. The dot spacers 16 are optional, particularly when the touch panel 10 is relatively small. The dot spacers 16 serve as supports having regard to the size, span, and strength of the first electrode plate 12.

At least one of the first conductive layer 122 and the second conductive layer 142 includes a carbon nanotube layer. The carbon nanotubes in the carbon nanotube structure are arranged isotropically, arranged along a same applied direction, or arranged along different directions. An angle between a primary alignment direction of the carbon nanotubes in the carbon nanotube structure and the carbon nanotube structure is 0° to approximately 15° when measured from the surface of the carbon nanotube structure. The carbon nanotube structure can be formed by pressing a carbon nanotube array. The angle is closely related to pressure applied to the carbon nanotube array. The greater the applied pressure is the smaller the angle becomes. The carbon nanotubes in the carbon nanotube structure can be parallel to the surface of the carbon nanotube structure when the angle is 0°. The carbon nanotube structure can be a transparent carbon nanotube film. A length and a width of the carbon nanotube film can be arbitrarily set as desired. A thickness of the carbon nanotube structure is in an approximate range from 0.5 nanometers to 100 micrometers.

In one suitable embodiment, the first conductive layer 122 and the second conductive layer 142 each include, at a minimum, one carbon nanotube layer. In this embodiment, the carbon nanotube structure includes a single carbon nanotube film. The carbon nanotube film includes a plurality of carbon nanotubes isotropically arranged, or arranged either along a same direction or along different directions. In one embodiment, the carbon nanotubes in the carbon nanotube film are parallel to the surface of the carbon nanotube film. In one suitable embodiment, the carbon nanotubes in the first conductive layer 122 are arranged along the first direction, and the carbon nanotubes in the second conductive layer 142 are arranged along the second direction. In another embodiment, the carbon nanotubes in the first conductive layer 122 are arranged along a direction oblique to a direction along which the carbon nanotubes in the second conductive layer 142 are arranged.

In one suitable embodiment, a transparent protective film 126 can be further located on the upper surface of the first electrode plate 12. The material of the transparent protective film 126 can be selected from a group consisting of silicon nitride, silicon dioxide, benzocyclobutene, polyester film, and polyethylene terephthalate. The transparent protective film 126 can, rather appropriately, be a slick plastic film and receive a surface hardening treatment to protect the first electrode plate 12 from being scratched when in use.

Figure 7:
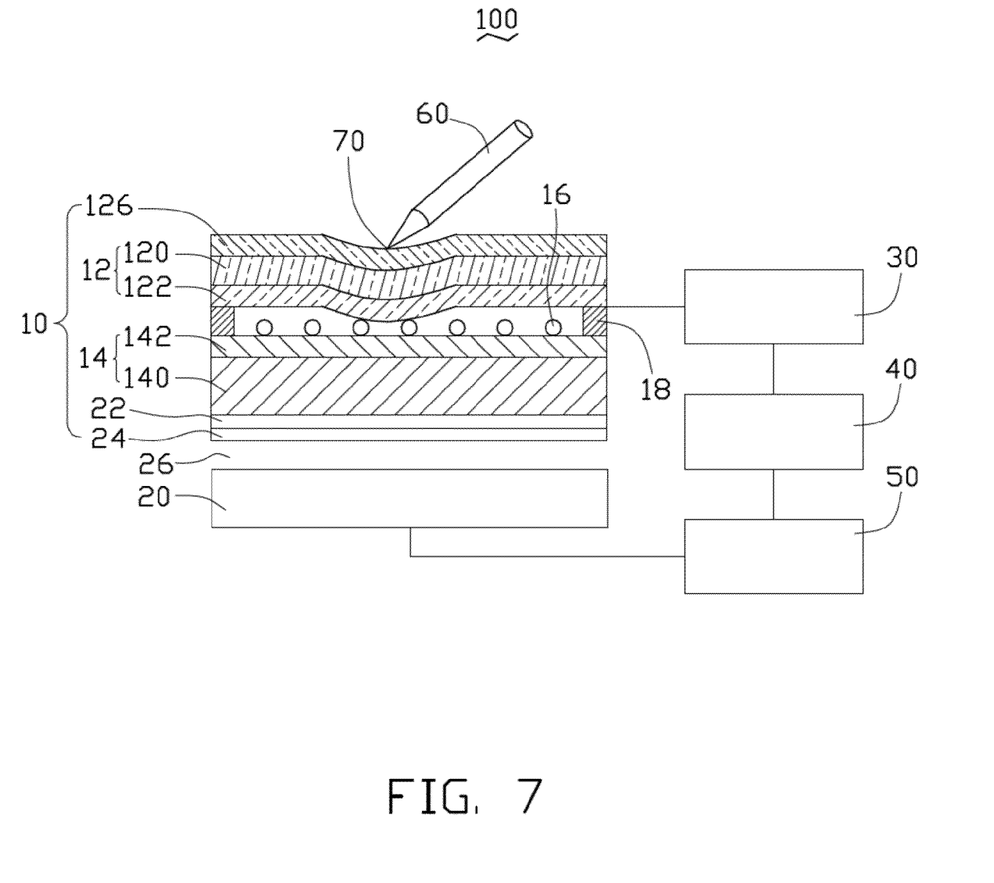
FIG. 7 is essentially a cross-sectional view of the touch panel of the exemplary embodiment used with a display element of a display device.

Referring also to FIG. 7, the touch panel 10 can further include a shielding layer 22 located on the lower surface of the second substrate 140. The material of the shielding layer 22 can be selected from indium tin oxide, antimony tin oxide, carbon nanotube film, and any other suitable electrically conductive material. In the present embodiment, the shielding layer is a carbon nanotube film. The carbon nanotube film includes a plurality of carbon nanotubes, and the orientations of the carbon nanotubes can be set as desired. The carbon nanotubes in the carbon nanotube film of the shielding layer 22 are arranged along a same direction. The carbon nanotube film is connected to ground and thus enables the touch panel 10 to operate without interference (e.g., electromagnetic interference).

Figure 3:
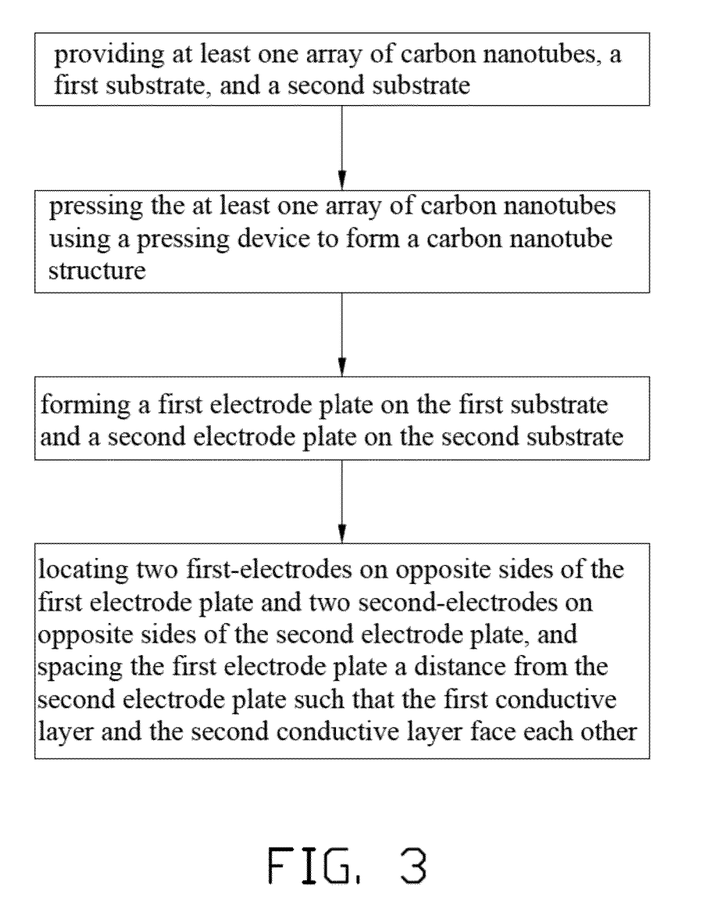
FIG. 3 is a flow chart of an exemplary method for making the touch panel of the exemplary embodiment.

Referring also to FIG. 3, an exemplary method for making the touch panel 10 includes the following steps: (a) providing at least one array of carbon nanotubes, a first substrate, and a second substrate; (b) pressing the array of carbon nanotubes with a pressing device to form a carbon nanotube structure on the first and second substrates, thereby forming a first conductive layer and a second conductive layer on the first and second substrates respectively; and (c) locating two first-electrodes on opposite short ends of the first electrode plate and two second-electrodes on opposite long sides of the second electrode plate, and spacing the first electrode plate a distance from the second electrode plate such that the first conductive layer and the second conductive layer face each other, thereby forming the touch panel 10.

In step (a), the array of carbon nanotubes is a super-aligned array of carbon nanotubes. The super-aligned array of carbon nanotubes can be formed by the substeps of: (a1) providing a substantially flat and smooth growing substrate; (a2) forming a catalyst layer on the growing substrate; (a3) annealing the growing substrate with the catalyst layer in air at a temperature in an approximate range from 700° C. to 900° C. for about 30 to 90 minutes; (a4) heating the growing substrate with the catalyst layer to a temperature in an approximate range from 500° C. to 740° C. in a furnace with a protective gas therein; and (a5) supplying a carbon source gas to the furnace for about 5 to 30 minutes and growing the super-aligned array of carbon nanotubes on the growing substrate.

In step (a1), the growing substrate can be a P-type silicon wafer, an N-type silicon wafer, or a silicon wafer with a film of silicon dioxide thereon. Preferably, a 4-inch P-type silicon wafer is used as the growing substrate.

In step (a2), the catalyst can be made of iron (Fe), cobalt (Co), nickel (Ni), or any alloy thereof.

In step (a4), the protective gas can be made up of at least one of nitrogen ($N_2$), ammonia ($NH_3$), and a noble gas. In step (a5), the carbon source gas can be a hydrocarbon gas, such as ethylene ($C_2H_4$), methane ($CH_4$), acetylene ($C_2H_2$), ethane ($C_2H_6$), or any combination thereof.

The super-aligned array of carbon nanotubes can have a height of about 50 microns to 5 millimeters. The super-aligned array of carbon nanotubes includes a plurality of carbon nanotubes parallel to each other and approximately perpendicular to the growing substrate. The carbon nanotubes in the super-aligned array can be selected from a group consisting of single-walled carbon nanotubes, double-walled carbon nanotubes, and multi-walled carbon nanotubes. Diameters of the single-walled carbon nanotubes are in an approximate range from 0.5 nanometers to 50 nanometers. Diameters of the double-walled carbon nanotubes are in an approximate range from 1 nanometer to 50 nanometers. Diameters of the multi-walled carbon nanotubes are in an approximate range from 1.5 nanometers to 50 nanometers.

The super-aligned array of carbon nanotubes formed under the above conditions is essentially free of impurities such as carbonaceous or residual catalyst particles. The carbon nanotubes in the super-aligned array are closely packed together by van der Waals force.

Figure 4:
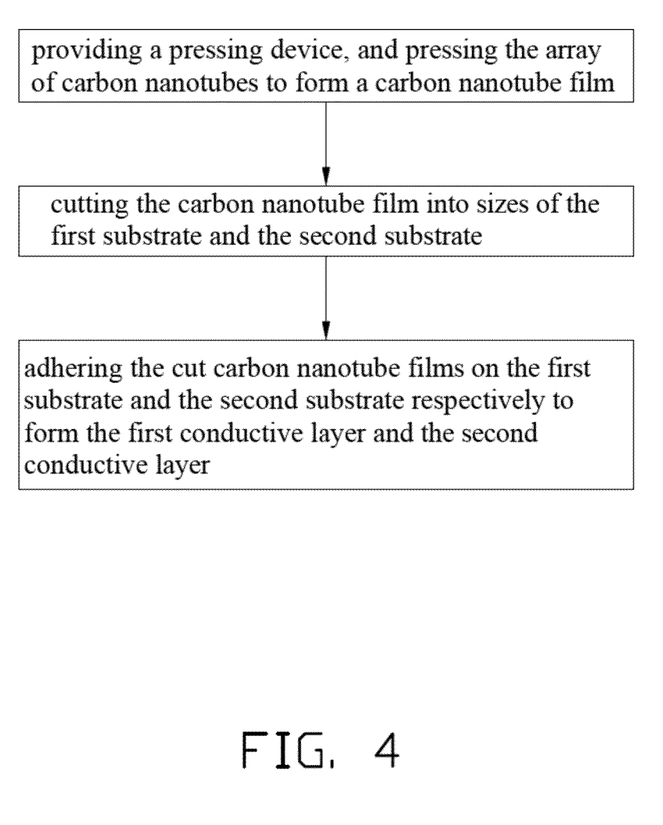
FIG. 4 is a flow chart of an exemplary method for making a first conductive layer and a second conductive layer of the exemplary embodiment.

In step (b), the carbon nanotube array is adherent in nature, and therefore the first substrate and the second substrate can be firmly adhered to the array of carbon nanotubes. In the present embodiment, either of two methods can form the first conductive layer and the second conductive layer. Referring to FIG. 4, the first method includes the steps of: (b1) providing a pressing device, and pressing the array of carbon nanotubes to form a carbon nanotube film; (b2) cutting the carbon nanotube film into sizes of the first substrate and the second substrate; and (b3) adhering the cut carbon nanotube films on the first substrate and the second substrate respectively to form the first conductive layer and the second conductive layer. The second method includes the steps of: (b1') placing first surfaces of the first substrate and the second substrate on the array of carbon nanotubes; (b2') providing a pressing device, and pressing opposite second surfaces of the first substrate and the second substrate so that the first substrate and the second substrate are pressed onto the array of carbon nanotubes to form a carbon nanotube film on each of the first substrate and the second substrate; and (b3') cutting away excess carbon nanotube film to form the first conductive layer on the first substrate and the second conductive layer on the second substrate.

In step (b), a certain pressure can be applied to the array of carbon nanotubes by the pressing device. In the process of pressing, the carbon nanotubes in the array of carbon nanotubes form each of the carbon nanotube films under pressure. The carbon nanotubes in each carbon nanotube film are nearly all parallel to a surface of the carbon nanotube film. In step (b1), in the process of pressing, the carbon nanotubes slant, thereby forming a carbon nanotube film having a free-standing structure on the substrate on which the carbon nanotube array is initially formed. The carbon nanotubes in the free-standing structure are nearly all parallel to a major surface of the carbon nanotube film, and are arranged isotropically, or arranged along a same direction or arranged along a different directions. In step (b2'), the carbon nanotube film, under a certain pressure, separates from the growing substrate on which the carbon nanotube array is initially formed, and is adhered on the first substrate and the second substrate respectively because of the adhesive properties of the carbon nanotubes.

Figure 5:
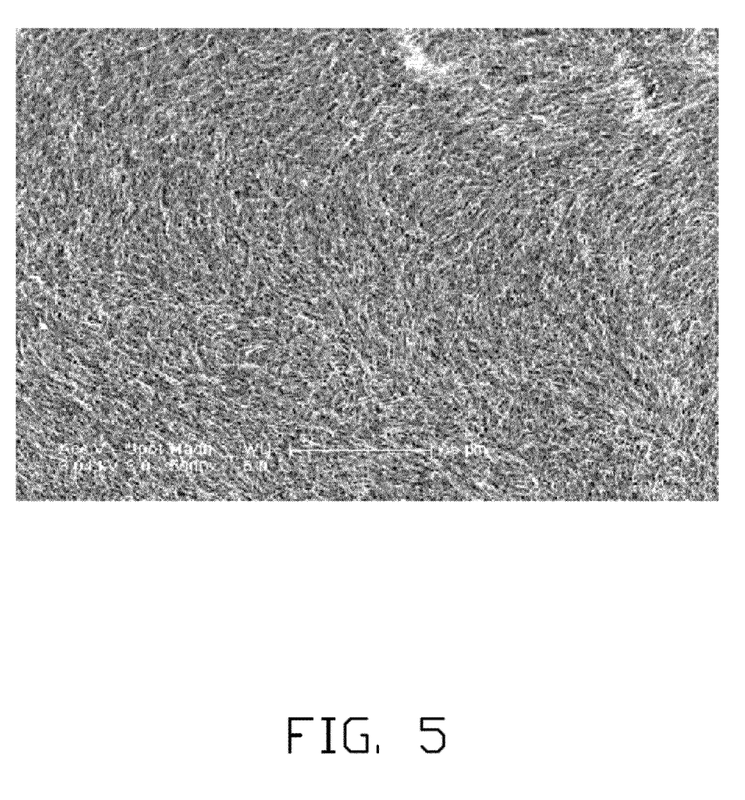
FIG. 5 shows a Scanning Electron Microscope (SEM) image of an isotropic carbon nanotube film that can be utilized in the touch panel of the exemplary embodiment.
Figure 6:
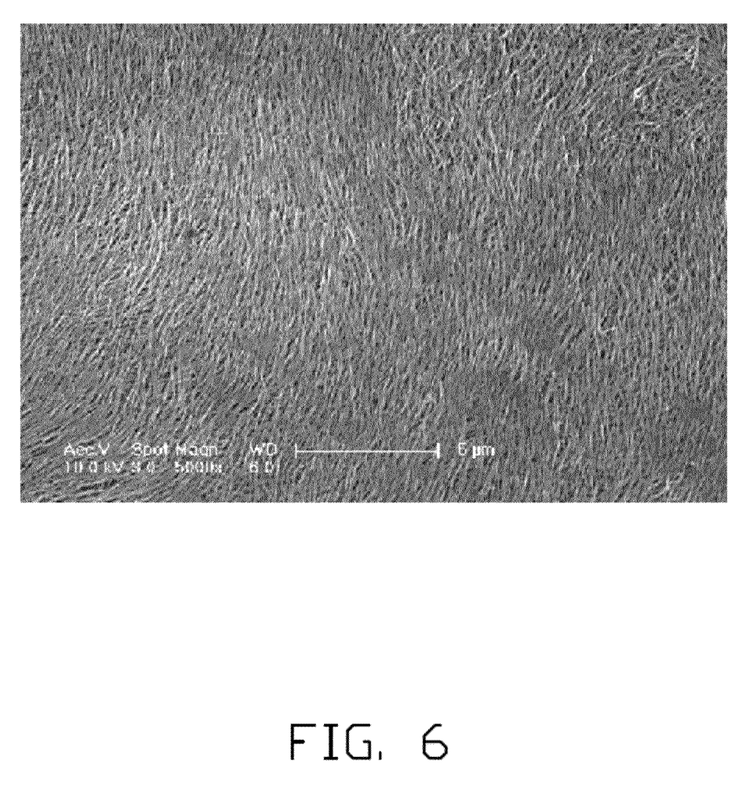
FIG. 6 shows an SEM image of another carbon nanotube film that can be utilized in the touch panel of the exemplary embodiment, with the carbon nanotubes in the carbon nanotube film being arranged in a preferred orientation.

In the present embodiment, the pressing device can be a pressure head. The pressure head has a smooth surface. The shape of the pressure head and the pressing direction can, opportunely, determine the direction of the carbon nanotubes arranged in each carbon nanotube film. In one embodiment, referring to FIG. 5, when a planar pressure head is used to press the array of carbon nanotubes along a direction perpendicular to the applicable substrate, a carbon nanotube film having a plurality of carbon nanotubes isotropically arranged can be obtained. Referring to FIG. 6, when a roller-shaped pressure head is used to travel across and press the array of carbon nanotubes along a predetermined single direction, a carbon nanotube film having a plurality of carbon nanotubes aligned along a general direction is obtained. When a roller-shaped pressure head is used to travel across and press the array of carbon nanotubes along different directions, a carbon nanotube film having a plurality of carbon nanotubes aligned along corresponding different directions is obtained.

In the process of pressing, the carbon nanotubes will bend/fall over, thereby forming a carbon nanotube film having a free-standing structure with slanted carbon nanotubes. The carbon nanotubes in the free-standing structure are nearly all parallel to a surface of the carbon nanotube film, and are isotropically arranged, arranged along a same direction, or arranged along different directions.

In the present embodiment, each carbon nanotube structure includes a single carbon nanotube film. Each carbon nanotube film includes a plurality of carbon nanotubes arranged along a same direction, the direction being substantially the same as the traveling and pressing direction. It is to be understood that a degree of the slant of the carbon nanotubes in the carbon nanotube film relative to the vertical is proportional to the pressure applied. The greater the pressure applied is, the greater the degree of slant becomes. An angle a between the alignment directions of the carbon nanotubes in the carbon nanotube film and the major surface of the carbon nanotube film is in an approximate range from 0° to 15°. The conductive property of the carbon nanotube film is influenced the angle $\alpha$. The smaller the angle $\alpha$ is, the better the conductive property of the carbon nanotube film becomes. It can be understood that the angle $\alpha$ relates to the conductive property of the carbon nanotube film. Therefore, in one quite suitable embodiment, the carbon nanotubes in the carbon nanotube film are substantially parallel to the surface of the carbon nanotube film. A thickness of the carbon nanotube film is opportunely determined by the height of the carbon nanotube array and the pressure applied. That is, the greater the height of the carbon nanotube array and/or the less the pressure, the greater the thickness of the carbon nanotube film.

In an alternative embodiment of step (b1'), it can be understood that first surfaces of the first substrate and the second substrate can be respectively placed on two arrays of carbon nanotubes.

In an alternative embodiment of each of the carbon nanotube layers, the carbon nanotube structure can include at least two stacked carbon nanotube films. For example, when the carbon nanotube structure includes two stacked carbon nanotube films, a method for forming such carbon nanotube structure can be as follows. First, the first carbon nanotube film is made according to either of the methods described above. Thereby, a carbon nanotube film adhered (formed) on each the first substrate and the second substrate is obtained. Then the first substrate and the second substrate each with the carbon nanotube film formed thereon is inverted and is placed on a carbon nanotube array in much the same way as described in steps (b1') above. After that, the equivalent of steps (b2') and (b3') as described above are performed. Thereby, a two-layer carbon nanotube film structure on each of the first and second substrates is formed. The two adjacent carbon nanotube films in each such film structure are combined together by van der Waals attractive force.

The width of each carbon nanotube film depends on a size of the carbon nanotube array. The length of the carbon nanotube film can be arbitrarily set as desired. In one useful embodiment, when the growing substrate is a 4-inch P-type wafer as in the present embodiment, the width of the carbon nanotube film is in an approximate range from 0.5 nanometers to 10 centimeters, and the thickness of the carbon nanotube film is in an approximate range from 0.5 nanometers to 100 micrometers. The carbon nanotubes in the carbon nanotube film can be selected from a group consisting of single-walled carbon nanotubes, double-walled carbon nanotubes, and multi-walled carbon nanotubes. Diameters of the single-walled carbon nanotube are in an approximate range from 0.5 nanometers to 50 nanometers. Diameters of the double-walled carbon nanotubes are in an approximate range from 1 nanometer to 50 nanometers. Diameters of the multi-walled carbon nanotubes are in an approximate range from 1.5 nanometers to 50 nanometers.

In step (c), the first-electrodes 124 and the second-electrodes 144 are made of conductive silver paste. An exemplary method for making the first-electrodes 124 and the second-electrodes 144 includes the following steps: (c1) coating the conductive silver paste on opposite short ends of the first conductive layer 122 of the first electrode plate 12 and on opposite long sides of the second conductive layer 142 of the second electrode plate 14 via a screen printing method or a spraying method; and (c2) baking the first electrode plate 12 and the second electrode plate 14 in an oven for 10-60 minutes at a temperature in an approximate range from 100° C. to 120° C. to solidify the conductive silver paste, thus obtaining the first-electrodes 124 and the second-electrodes 144. Each of the first-electrodes 124 is oriented along the second direction, and each of the second-electrodes 144 is oriented along the first direction, with the first direction being perpendicular to the second direction.

The insulative frame 18 can be made of insulative resin or any other suitable insulative material (e.g., insulative binding agent). In the present embodiment, the material of the insulative frame 18 is insulative binding agent. The insulative binding agent can be coated on the edges of the upper surface of the second electrode plate 14 and/or on the edges of the lower surface of the first electrode plate 12. The insulative binding agent bonds the first and second electrode plates 12, 14 together.

The material of the transparent protective film 126 can be selected from a group consisting of silicon nitride, silicon dioxide, benzocyclobutene, polyester film, and polyethylene terephthalate. In the present embodiment, the transparent protective film is adhesive polyethylene terephthalate film. The adhesive polyethylene terephthalate film can be adhered to the upper surface of the first substrate 120, thereby serving as the transparent protective film 126.

Referring also to FIG. 7, a display device 100 includes the touch panel 10, a display element 20, a first controller 30, a central processing unit (CPU) 40, and a second controller 50. The touch panel 10 is opposite and adjacent to the display element 20, and is connected to the first controller 30 by an external circuit. The touch panel 10 can be positioned at a distance from the display element 20, or can be installed directly on the display element 20. The first controller 30, the CPU 40, and the second controller 50 are electrically connected. The CPU 40 is connected to the second controller 50 to control the display element 20.

The display element 20 can be, e.g., a liquid crystal display, a field emission display, a plasma display, an electroluminescent display, a vacuum fluorescent display, a cathode ray tube, or another display device.

When the shielding layer 22 is located on the lower surface of the second substrate 140, a passivation layer 24 is located on a lower surface of the shielding layer 22 that faces away from the second substrate 140. The material of the passivation layer 24 can, be silicon nitride or silicon dioxide, for example. The passivation layer 24 can be spaced a certain distance from the display element 20, or can be installed directly on the display element 20. In the illustrated embodiment, the passivation layer 24 is spaced a certain distance from the display element 20, thereby defining a gap 26. The passivation layer 24 can protect the shielding layer 22 from being damaged by excessive external force.

In operation, a voltage of 5V (volts) is respectively applied to the two first-electrodes 124 of the first electrode plate 12 and the two second-electrodes 144 of the second electrode plate 14. A user operates the display device 100 by pressing the transparent protective film 126 of the touch panel 10 with a finger, a pen 60, or the like while visually observing the display element 20 through the touch panel 10. The pressing causes a deformation 70 of the first electrode plate 12. The deformation 70 establishes a connection between the first conductive layer 122 and the second conductive layer 142. The first controller 30 can detect changes in voltages along the first direction of the first conductive layer 122 and along the second direction of the second conductive layer 142. Then the first controller 30 transforms the changes in voltages into coordinates of the pressing point, and sends the coordinates to CPU 40. The CPU 40 then sends out commands according to the coordinates to control the display of the display element 20.

The properties of the carbon nanotubes provide each of the carbon nanotube films of the carbon nanotube layers with superior toughness, high mechanical strength, and uniform conductivity. Thus, the touch panel 10 and the display device 100 adopting the carbon nanotube layers are durable and highly reliable. Furthermore, the carbon nanotubes have excellent electrical conductivity; and each of the carbon nanotube layers is formed with a plurality of carbon nanotubes arranged isotropically, arranged along a same direction or arranged along different directions. In either case, the carbon nanotube structure has a uniform resistance distribution and high electrical conductivity, thus providing the touch panel 10 and the display device 100 with improved sensitivity and accuracy. Moreover, the method for making the carbon nanotube films via pressing the carbon nanotube array using a pressing device is simple, without the need for a vacuum or heating processes. Accordingly, the touch panel 10 and the display device 100 can be manufactured inexpensively.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

It is also to be understood that the above description and the claims drawn to a method may include some indication in reference to certain steps. However, the indication used is only to be viewed for identification purposes and not as a suggestion as to an order for the steps.

What is claimed is:

1. A method for making a touch panel, the method comprising:
   (a) providing at least one array of carbon nanotubes comprising carbon nanotubes oriented along a same direction, a first substrate, and a second substrate, wherein the at least one array of carbon nanotubes is located on the first substrate or the second substrate, and the carbon nantoubes are perpendicular to the first substrate or the second substrate;

(b) pressing the at least one array of carbon nanotubes using a pressing device to form a carbon nanotube structure located on the first substrate or the second substrate, wherein an angle between a primary alignment direction of the carbon nanotubes in the carbon nanotube structure and a surface of the carbon nanotube structure in contact with the first substrate or the second substrate is greater than 0° and smaller than 15°.

(c) forming a first electrode plate on the first substrate and a second electrode plate on the second substrate; and (d) locating two first-electrodes on opposite sides of the first electrode plate and two second-electrodes on opposite sides of the second electrode plate, and spacing the first electrode plate a distance from the second electrode plate such that the first conductive layer and the second conductive layer face each other.

2. The method as claimed in claim 1, wherein (b) further comprises:
   (b1) providing a pressing device, and pressing the array of carbon nanotubes to form a carbon nanotube film;
   (b2) cutting the carbon nanotube film into sizes of the first substrate and the second substrate; and
   (b3) adhering the cut carbon nanotube films on the first substrate and the second substrate respectively to form the first conductive layer and the second conductive layer.

3. The method as claimed in claim 1, wherein in (b), the pressing device is a planar pressure head and the planar pressure head is used to press the array of carbon nanotubes along a direction perpendicular to the substrate.

4. The method as claimed in claim 1, wherein in (b), the pressing device is a roller-shaped pressure head, and the roller-shaped pressure head is used to press the array of carbon nanotubes along a selected one of a same direction and different directions.

5. The method as claimed in claim 1, wherein in (a), the array of carbon nanotubes is a super-aligned array of carbon nanotubes formed by substeps of:
   (a1) providing a substantially flat and smooth growing substrate;
   (a2) forming a catalyst layer on the growing substrate;
   (a3) annealing the growing substrate with the catalyst layer in air at a temperature in an approximate range from 700° C. to 900° C. for about 30 to 90 minutes;
   (a4) heating the growing substrate with the catalyst layer to a temperature in an approximate range from 500° C. to 740° C. in a furnace with a protective gas therein; and
   (a5) supplying a carbon source gas to the furnace for about 5 to 30 minutes and growing the super-aligned array of carbon nanotubes on the growing substrate.

6. The method as claimed in claim 5, wherein in (a1), the growing substrate is a P-type silicon wafer, an N-type silicon wafer, or a silicon wafer with a film of silicon dioxide thereon.

7. The method as claimed in claim 5, wherein in (a1), the catalyst is made of iron (Fe), cobalt (Co), nickel (Ni), or any alloy thereof 8. The method as claimed in claim 5, wherein (b) further comprises:
   (b1') placing first surfaces of the first substrate and the second substrate on the array of carbon nanotubes;
   (b2') providing a pressing device, and pressing the array of carbon nanotubes by pressing second surfaces of the first substrate and the second substrate to form a carbon nanotube structure on the first surface of each of the first and second substrates, wherein the first surface is opposite to the second surface; and
   (b3') cutting away excess carbon nanotube structure to form the first conductive layer and the second conductive layer.

9. A method for making a touch panel, the method comprising:
   (a) providing two arrays of carbon nanotubes comprising carbon nanotubes oriented along a same direction, a first substrate, and a second substrate, wherein the two arrays of carbon nanotubes are separately located on the first substrate and the second substrate perpendicularly;
   (b) pressing the two arrays of carbon nanotubes using a pressing device to form a first condutice layer located on the first substrate, and a second conductive layer on the second substrate, wherein an angle between a primary alignment direction of the carbon nanotubes in the first conductive layer and a surface of the first conductive layer in contact with the first substrate is greater than 0° and smaller than 15°, and an angle between a primary alignment direction of the carbon nanotubes in the second conductive layer and a surface of the second conductive layer in contact with the second substrate is greater than 0° and smaller than 15°;
   (c) locating two first-electrodes on opposite short ends of the first conductive layer and two second-electrodes on opposite long sides of the second conductive layer to obtain a first electrode plate and a second electrode plate; and
   (d) spacing the first electrode plate a distance from the second electrode plate such that the first conductive layer and the second conductive layer face each other.

10. The method of claim 9, wherein each of the first-electrodes is oriented along a second direction, and each of the second-electrodes is oriented along a first direction, with the first direction being perpendicular to the second direction.

11. The method as claimed in claim 9, wherein in (a), the array of carbon nanotubes is a super-aligned array of carbon nanotubes formed by substeps of:
   (a1) providing a substantially flat and smooth growing substrate;
   (a2) forming a catalyst layer on the growing substrate;
   (a3) annealing the growing substrate with the catalyst layer in air at a temperature in an approximate range from 700° C. to 900° C. for about 30 to 90 minutes;
   (a4) heating the growing substrate with the catalyst layer to a temperature in an approximate range from 500° C. to 740° C. in a furnace with a protective gas therein; and
   (a5) supplying a carbon source gas to the furnace for about 5 to 30 minutes and growing the super-aligned array of carbon nanotubes on the growing substrate.

12. The method as claimed in claim 11, wherein in (a1), the growing substrate is a P-type silicon wafer, an N-type silicon wafer, or a silicon wafer with a film of silicon dioxide thereon.

13. The method as claimed in claim 11, wherein in (a1), the catalyst is made of iron (Fe), cobalt (Co), nickel (Ni), or any alloy thereof.

* * * * *